May 14, 1935. R. SCHMIDT 2,001,504
GASEOUS ELECTRIC DISCHARGE LAMP DEVICE
Filed Feb. 23, 1934
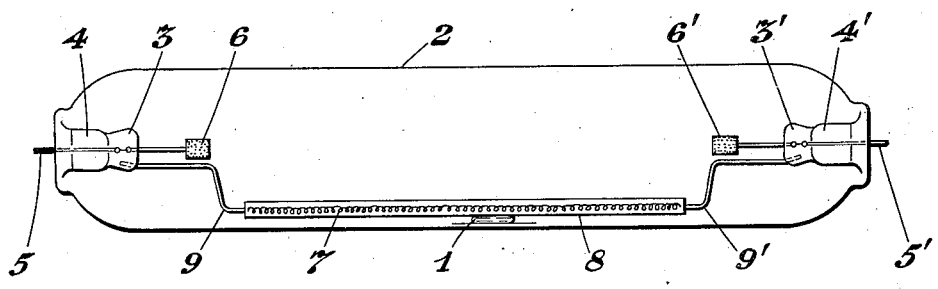
INVENTOR
Rudolf Schmidt
BY Harry E. Dunham
ATTORNEY Patented May 14, 1935

2,001,504

UNITED STATES PATENT OFFICE 2,001,504

GASEOUS ELECTRIC DISCHARGE LAMP DEVICE

Rudolf Schmidt, Weisswasser, Germany, assignor to General Electric Company, a corporation of New York Application February 23, 1934, Serial No. 712,617
In Germany March 8, 1933

6 Claims. (Cl. 176—122)

The present invention relates to gaseous electric discharge lamp devices generally and more particularly the invention relates to glass compositions useful in connection with such devices having a filling of mercury vapor therein.

The glass containers of mercury vapor lamps frequently become brownish in color during the operation of the lamp which deleteriously affects the light transmission characteristics of the container to lower the efficiency of the lamp. This is due to the action of the hot mercury vapor, the ultra violet radiations and the ionized vapor particles. This brownish tinge of the container is particularly noticeable in mercury vapor discharge lamps having electrodes which are electron emitting when heated and a starting gas such as argon and/or neon and which lamps are operated at high temperatures and high current densities.

The object of the present invention is to provide a glass for the container of a gaseous electric discharge lamp device having a mercury vapor filling or a gaseous filling comprising mercury vapor which glass does not become brown in color during the operation of the lamp device. Another object of the invention is to provide an easily workable glass for the container of a mercury vapor lamp which glass does not become brownish during the operating life of the device. Still further objects and advantages attaching to the device and to its use and operation will be apparent to those skilled in the art from the following particular description.

The ultra-violet transmitting hard glasses, by which I mean glasses having a coefficient of expansion in the range 30 to $55.10^{-7}$, do not have as great a tendency to turn brownish as do the soft glasses when used in the containers of mercury vapor discharge lamp devices. By soft glasses I mean glasses having a coefficient of expansion between 75 and $100.10^{-7}$. The use of difficultly workable, hard glasses for mercury vapor discharge lamps is not generally desirable as it is more difficult and more expensive to manufacture containers from hard glasses than from soft glasses; the sealing-in of tungsten or molybdenum current leads being a particularly difficult and expensive procedure in hard glass containers.

I have discovered that a soft, easily workable glass containing boric acid, earth alkali, and alkali materials used in the container of a mercury vapor discharge lamp does not become brown during the operation of the lamp. A glass of this kind is a glass having a boric acid content of substantially 4 to 18%, a content of alkali earths, such as magnesium oxide, calcium oxide, barium oxide and zinc oxide, of approximately 3–10% and an alkali content of approximately 15–22% at least two-thirds of which alkali content is potassium oxide. This glass contains alumina up to about 5%, when desired, in order to make the glass more easily workable in the flame.

Containers made of glasses having the following compositions do not assume a brownish tinge during the operation of a mercury vapor lamp:—

|  | 1 | 2 | 3 |
|---|---|---|---|
|  | Per cent | Per cent | Per cent |
| SiO₂ | 70 | 68 | 61 |
| B₂O₃ | 4 | 8 | 10 |
| K₂O | 15 | 13 | 17 |
| Na₂O | 2 | 3 | 4 |
| CaO | 5 | 5 | 5 |
| ZnO | 5 |  |  |
| Al₂O₃ |  | 3 | 3 |

It will be understood, of course, that when the mercury vapor lamp is to be used as an ultra violet generator the glass of the container thereof should not contain any material such as iron oxide, titanium oxide, manganese oxide or antimony oxide, which would deleteriously affect the ultra violet transmission characteristics of the container.

In the drawing accompanying and forming part of this specification a mercury vapor electric discharge lamp embodying the present invention is shown in a side elevational view.

Referring to the drawing the lamp device comprises a tubular container 2 having a gaseous filling therein comprising a starting gas, such as argon and a vaporizable material, such as mercury. The vaporizable material is indicated at 1 in the drawing. Said container 2 has stems 4 and 4' at each end thereof. Current leads 5 and 5' having electrodes 6 and 6' mounted on the ends thereof respectively are sealed into the pinched part 3 and 3' of said stems 4 and 4' respectively. Said electrodes 6 and 6' are electron emitting when heated and consist of a pressed, sintered mixture of finely divided, high melting point metal, such as tungsten and/or molybdenum and electron emitting material, such as barium oxide. Helically coiled wire 7, such as a tungsten wire, enclosed in an insulating tube 8, of quartz for example, extends along the discharge path between said electrodes 6 and 6' in said container 2. The ends 9 and 9' of said wire 7 project from the tube 8 and are sealed into the pinched parts 3 and

2

3' of said stems 4 and 4' respectively and are adjacent said electrodes 6 and 6' respectively over part of their length. When potential is applied across the terminals of the lamp a glow discharge is established between each of said electrodes 6 and 6' and the wire parts 9 and 9' adjacent thereto. These discharges heat up said electrodes to their electron emitting temperature. A condenser discharge takes place in said wire 7 at the same time and these phenomena quickly and heavily ionize the gas throughout the length of the discharge path between said electrodes 6 and 6' to facilitate the starting of the main discharge between said electrodes 6 and 6'.

The container 2 consists of a glass made in accordance with one of the formulae given heretofore and said container 2 does not become brown in color during the operating life of the gaseous electric discharge device even though said container 2 is at a high temperature during the operation of the lamp device.

It will be understood, of course, that electron emitting electrodes 6 and 6' permit the use of high current densities in the lamp and the lamp is enclosed in a heat conserving jacket or envelope, when desired. The container 2 is thus maintained at an elevated temperature and the vapor is at a high pressure to increase the intensity of the light emitted by the lamp device. When desired, the lamp is of the "unsaturated vapor pressure" type, that is, the quantity of vaporizable material introduced into the lamp is such that this material is completely vaporized before the lamp has reached its operating temperature.

While I have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, a heater in the form of a tungsten filament surrounds each of said electrodes 6 and 6' to assist in quickly heating said electrodes to an electron emitting temperature during the starting period, when desired; said electrodes 6 and 6' are mixtures of electron emitting materials, such as a mixture of alkali earth metals or the compounds of such metals, or said electrodes 6 and 6' are of the type having a heater in a metal shell, the surface of the shell having a coating of electron emitting material.

What I claim as new and desire to secure by Letters Patent of the United States is:—

1. An electric discharge lamp device comprising a container, electrodes sealed therein, a gaseous atmosphere therein consisting of mercury vapor, said container consisting of a glass comprising 4 to 18% boric acid, 3 to 10% alkali earth material and 15 to 22% alkali material, more than two-thirds of said alkali material being potassium oxide.

2. An electric discharge lamp device comprising a container, electrodes sealed therein, a gaseous atmosphere therein comprising mercury vapor, said container comprising a glass comprising 4 to 18% boric acid, 3 to 10% alkali earth material and 15 to 22% alkali material, more than two-thirds of said alkali material being potassium oxide.

3. An electric discharge lamp device comprising a container, a electrodes sealed therein, a gaseous atmosphere therein consisting of mercury vapor, said container consisting of a glass comprising not more than 5% of alumina, 4 to 18% boric acid, 3 to 10% alkali earth material and 15 to 22% alkali material, more than two-thirds of said alkali material being potassium oxide.

4. An electric discharge lamp device comprising a container, electrodes sealed therein, a gaseous atmosphere therein consisting of mercury vapor, said container consisting of a glass having the following composition:—

| | Per cent |
|---|---|
| $SiO_2$ | 70 |
| $B_2O_3$ | 4 |
| $K_2O$ | 15 |
| $Na_2O$ | 2 |
| $CaO$ | 5 |
| $ZnO$ | 4 |

5. An electric discharge lamp device comprising a container, electrodes sealed therein, a gaseous atmosphere therein consisting of mercury vapor, said container consisting of a glass having the following composition:—

| | Per cent |
|---|---|
| $SiO_2$ | 68 |
| $B_2O_3$ | 8 |
| $K_2O$ | 13 |
| $Na_2O$ | 3 |
| $CaO$ | 5 |
| $Al_2O_3$ | 3 |

6. An electric discharge lamp device comprising a container, electrodes sealed therein, a gaseous atmosphere therein consisting of mercury vapor, said container consisting of a glass having the following composition:—

| | Per cent |
|---|---|
| $SiO_2$ | 61 |
| $B_2O_3$ | 10 |
| $K_2O$ | 17 |
| $Na_2O$ | 4 |
| $CaO$ | 5 |
| $Al_2O_3$ | 3 |

RUDOLF SCHMIDT.